United States Patent
Ando

(10) Patent No.: US 6,594,314 B1
(45) Date of Patent: Jul. 15, 2003

(54) MOTION VECTOR DETECTION METHOD AND APPARATUS

(75) Inventor: Yuji Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/582,156

(22) PCT Filed: Oct. 18, 1999

(86) PCT No.: PCT/JP99/05735
§ 371 (c)(1),
(2), (4) Date: Jul. 12, 2000

(87) PCT Pub. No.: WO00/24202
PCT Pub. Date: Apr. 27, 2000

(30) Foreign Application Priority Data

Oct. 22, 1998  (JP) .......................................... 10-301477
Oct. 22, 1998  (JP) .......................................... 10-301478
Oct. 22, 1998  (JP) .......................................... 10-301479

(51) Int. Cl.[7] .............................................. H04N 7/32
(52) U.S. Cl. ................................. 375/240.16; 348/699
(58) Field of Search ....................... 375/240.16, 240.17; 348/699; H04N 7/32

(56) References Cited

U.S. PATENT DOCUMENTS 6,108,039 A  * 8/2000  Linzer et al. .......... 375/240.16

FOREIGN PATENT DOCUMENTS

| EP | 1051040 A1 | * 8/2000 | ............ H04N/7/32 |
| JP | 8-223577 | 8/1996 | ............ H04N/7/32 |
| JP | 9-284777 | 10/1997 | ............ H04N/7/32 |
| JP | 9-294266 | 11/1997 | ............ H04N/7/32 |
| JP | 10-51792 | 2/1998 | ............ H04N/7/32 |
| JP | 10-126787 | 5/1998 | ............ H04N/7/32 |

* cited by examiner

Primary Examiner—Howard Britton
(74) Attorney, Agent, or Firm—Oblon, Spivak, McClelland, Maier & Neustadt, P.C.

(57) ABSTRACT

In a motion vector detection method for detection the motion vector of a field picture conforming to the interlaced scanning system, a motion vector of a second field picture is detected in a pre-set search range using a first field picture. A search range in detecting the motion vector for a third field picture is computed by comparing a field-to-field distance between a field picture to be referred to and the third field picture and the field-to-field distance between the first field picture and the second field picture. The motion vector of the third field picture is detected in a search range computed with a point indicated by the motion vector of the second field picture as a start point to reduce the processing volume in detecting the motion vector for the filed pictures of the interlaced scanning system.

22 Claims, 14 Drawing Sheets

Field distance

T : TOP FIELD
B : BOTTOM FIELD

MOTION VECTOR DETECTION METHOD AND APPARATUS

TECHNICAL FIELD

This invention relates to a method and apparatus for detecting the motion vector used in picture encoding conforming to the MPEG (Moving Picture Image Coding Experts Group).

BACKGROUND

The MPEG system is such an encoding system for compressing moving picture data by combining DCT (discrete cosine transform) within a picture, inter-picture motion compensation prediction and variable length coding.

In general, motion vector detection in inter-picture motion compensation prediction is performed by so-called block matching. In this block matching, for a reference block composed of a pre-set number of pixels in a current or target picture being processed, an area in a reference picture having the same number of pixels as the pre-set number of pixels is extracted as a reference block, pointed by the motion vector, with the same position in the reference picture as the target block as a starting point. An absolute value of the difference of the pixels of the target block and the reference block is calculated and the sum of the absolute values of the differences is taken of the totality of pixels in the reference block for detecting the motion vector. In detecting the motion vector, the area to be extracted in a search area of the reference picture is moved pixel-by-pixel to perform the block matching repeatedly. The motion vector is detected with a point corresponding to the smallest value of the sum of the absolute values of the differences as the base or start point.

However, in performing the block matching, the search area of the reference picture in which the motion vector was found is of the same size as the search area of the target picture in which the motion vector was found. On the other hand, in finding the motion vector of the reference picture, the motion vector of the target picture was detected with an area of a constant pre-set size as a search area, using the motion vector of the reference picture as a reference, even if the motion vector of the reference picture is predictable to some extent.

In addition, the processing volume of the processing for finding the motion vector by the above-described block matching is tremendous in connection with the processing in the block matching for finding the sum of the absolute values of the differences. Thus, the majority of time of the picture compression processing in MPEG etc is consumed in this processing to present obstacles in implementing the software. Therefore, reduction of the processing volume has been a desideratum.

DISCLOSURE OF THE INVENTION

It is therefore a first object of the present invention to provide a motion vector detection method and apparatus whereby it is possible to reduce the processing volume in detecting the motion vector or a field picture of the interlaced canning system.

It is a second object of the present invention to provide a motion vector detection method and apparatus whereby it is possible to reduce the processing volume as detection accuracy in detecting the motion vector is maintained.

It is a third object of the present invention to provide a motion vector detection method and apparatus whereby it is possible to reduce the processing time and processing volume in detecting the motion vector as the number of times of block matching in detecting the motion vector is reduced.

As a result of perseverant researches towards accomplishing the above object, the present inventor has found that high correlation between the top filed picture and the bottom field picture in detecting the motion vector for the respective field pictures making up a moving picture can be exploited for motion vector prediction.

In connection with the above-mentioned first object, the present invention provides a motion vector detecting method and apparatus for detecting the motion vector in a field picture conforming to the interlaced scanning system including detecting a motion vector of a second field in a pre-set search range, using a first field picture, computing a search range for detecting the motion vector of a third field picture, by comparing a field-to-field distance between a field picture to be referred to and a third field picture and a field-to-field distance between the first field picture and a second field picture, and detecting a motion vector for a third field picture with the computed search range with a point indicated by the motion vector for the second field picture as a start point.

In this motion vector detection method and apparatus, the search area in detecting the motion vector for the field picture is set as it is changed using a motion vector of another field picture. The motion vector for the third field picture is detected by block matching in the search range thus set.

In connection with the above-mentioned second object, the present invention provides a motion vector detection method and apparatus including determining a first search range centered about a point specifying a motion vector of a reference block contained in a reference frame temporally or spatially proximate to a target frame, determining a second search range centered about a point obtained on elongating a motion vector of the reference block in dependence upon the frame-to-frame distance between a target frame and a reference frame, and computing picture data of a target block contained in the target frame and picture data of a reference block in the reference frame in a motion vector search range containing a first search range from the first range determining means and a second search range from the second search range to detect the motion vector of the reference block.

In this motion vector detection method and apparatus, the first search area is determined with the motion vector of the reference block as a start point, in detecting the motion vector of the target block, while the second search area is determined in accordance with the point elongated from the motion vector of the reference block to detect the motion vector of the target block in the motion vector search range containing the first and second search ranges.

The present inventor has conducted perseverant searches towards accomplishing the third object and found that the high correlation in the motion vectors of the neighboring pixel blocks in detecting the motion vector can be used in predicting the motion vector.

In connection with the third object, the present invention provides a motion vector detection method for detecting a motion vector for a picture composed of a plurality of blocks, including detecting a motion vector of a first block in a first search range, setting a second search range in detecting the motion vector of a second block based on a motion vector for the first blocks neighboring to the second block on either sides of the second block in the horizontal direction or vertical direction, and detecting the motion vector of the second block by block matching performed in the second search range.

In this motion vector detection method and apparatus, the motion vector of the first block is detected by performing block matching in the first search area, whilst the motion vector of the second block is detected by setting a second search area different in size from the pre-set search range using the motion vector of the neighboring first block to detect the motion vector for the second block.

Other objects and specific advantages provided by the present invention will be more apparent in detailed explanation of the embodiment as described below.

BEST MODE FOR CARRYING OUT THE INVENTION

Preferred embodiments conforming to the first to third objects of the invention will be explained in detail with reference to the drawings.

In the following description, a motion vector detection device for setting the search area to detect the motion vector by exploiting the correlation between the top and bottom fields, a motion vector detection device for setting the search area to detect the motion vector by exploiting the correlation between temporally previous and temporally succeeding frames or fields and a motion vector detection device for setting the search area to detect the motion vector by exploiting the high correlation in the motion vectors of the neighboring pixel blocks, are explained as a first embodiment, a second embodiment and a third embodiment, respectively.

Figure 1:
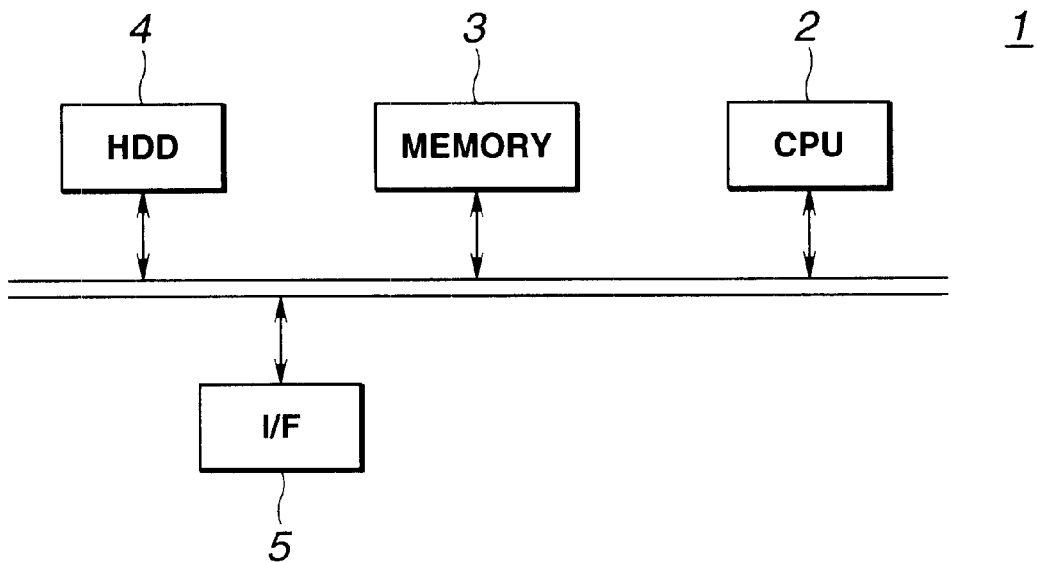
FIG. 1 is a block diagram shoeing the structure of a motion vector detection apparatus according to a first embodiment of the present invention.

The motion vector detection device according to a first embodiment of the present invention is configured as shown in for example in FIG. 1.

The present motion vector detection device 1 includes a CPU (central processing unit) 2 for detecting the motion vector in the picture encoding processing conforming to the MPEG2 standard for field pictures. The CPU 2 starts the motion vector detection program to detect the motion vector. In detecting the motion vector, this CPU 2 uses image data and the motion vector detection program stored in a memory 3. The CPU 2 then manages control to output a control signal to the memory 3 and a hard disc drive (HDD) 4 to store picture data and the motion vector detection program stored in the HDD 4 in the memory 3.

In performing picture compressing processing conforming to, for example, the MPEG system, the CPU 2 performs DCT (discrete cosine transform) on an I-picture (intra-picture), while performing motion compensated prediction on a B-picture (bi-directionally predictive coded picture) and a P-picture (predictive-coded picture) by way of performing picture compression. When finding the motion vector for a given field picture, reference is had to the field-to-field distance of temporally neighboring field pictures to determine the search area used in searching the motion vector. The CPU 2 performs block matching in the search area in terms of a macroblock, made up of, for example, 8×8 pixels, as a unit, to detect the motion vector.

In performing the block matching, the CPU 2 extracts a target block contained in a target picture being processed for detecting a motion vector, and a sole reference block indicated by a motion vector with a position of a reference field picture position in register with the target block as a starting point. The target block is made up of a pre-set number of blocks. The CPU 2 computes absolute values of the differences of registering pixels of the target block and the reference block and computes the sum of the absolute values of the differences of the totality of pixels in the target block.

In detecting the motion vector, the CPU 2 performs the above-described block matching repeatedly as it shifts the area extracted in the search area of the reference field picture pixel-by-pixel to detect a motion vector having a point indicating the smallest sun value of the absolute values of the differences as a base point. The processing by the CPU 2 for detecting the motion vector by computing the search area will be explained subsequently in detail.

The memory 3 has its storage contents controlled by the CPU 2. As for this memory 3, the motion vector detection program and the picture data are stored from the HDD 4 in accordance with control signals from the CPU 2, while the motion vector detection program and the picture data stored therein are read out.

The HDD 4 stores the picture data and the motion vector detection program. The picture data stored in the HDD 4, if specified, are outputted to the memory 3 in accordance with the control signal from the CPU 2.

Figure 2:
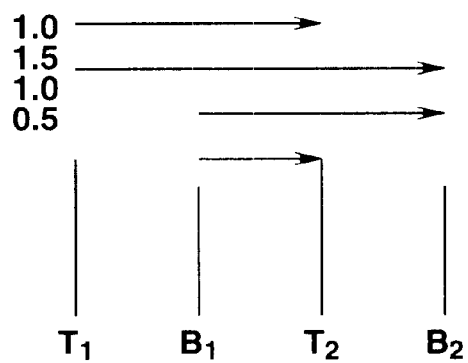
FIG. 2 illustrates a field-to-field distance of field pictures in the interlaced scanning system.

The picture data stored in the HDD 4 are time-domain moving picture data, composed of alternately arranged top field pictures (T) and bottom field pictures (B) conforming to the interlaced scanning system, as shown in FIG. 2. The CPU 2 performs the processing of computing the search area in such a manner that, if the field-to-field distance between a top field picture $T_1$ and a next top field picture $T_2$ is "1.0", the field-to-field distance between the top field picture $T_1$ and a bottom field picture $B_2$ is set to "0.5" and the field-to-field distance between the bottom field picture $B_1$ and a bottom field picture $B_2$ is set to "1.0" to compute the search area.

An I/F (interfacing) circuit 5, shown in FIG. 1, is fed with picture data from outside, while outputting picture data to outside, responsive to a control signal from the CPU 2. If fed with picture data from outside, the I/F circuit 5 outputs the picture data to the HDD 4.

Figure 3:
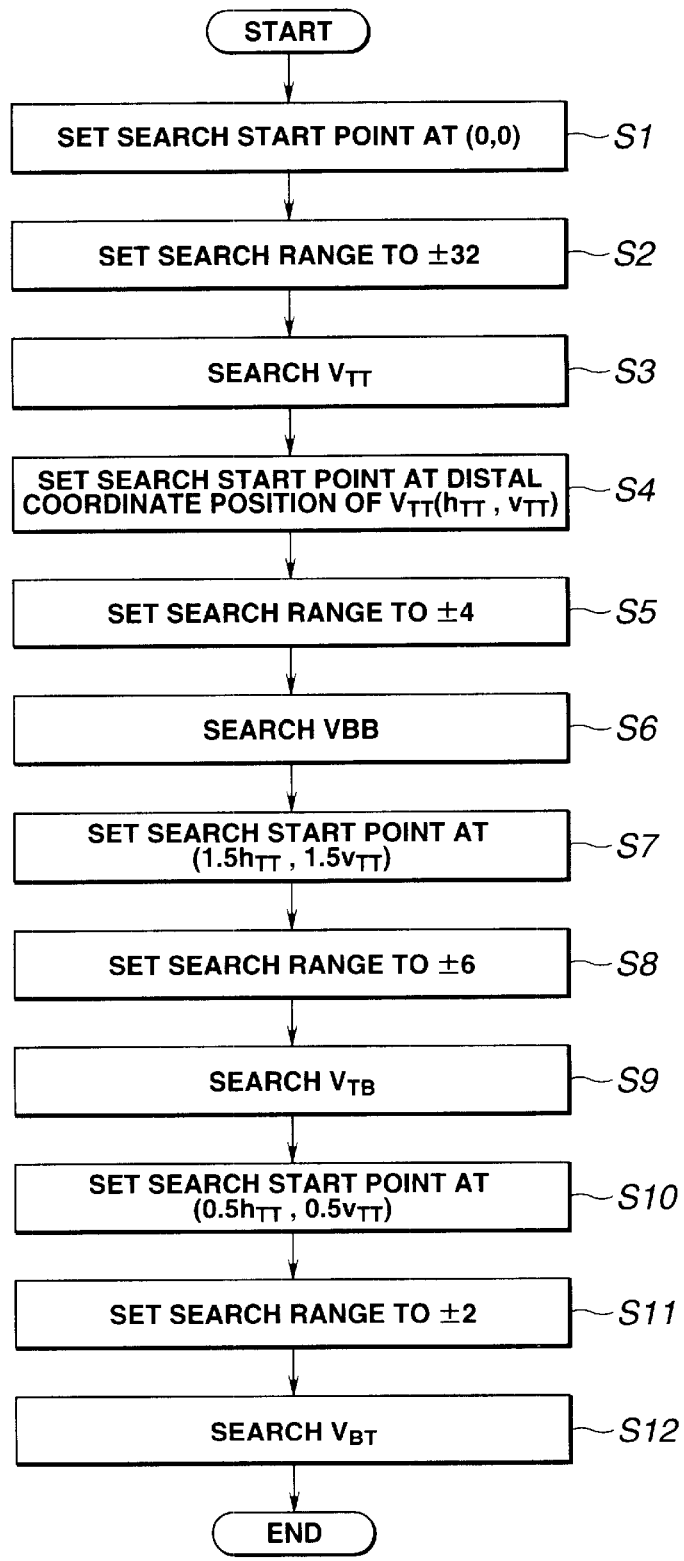
FIG. 3 is a flowchart for showing the processing sequence for a CPU provided in a motion vector detection device of the first embodiment to detect the motion vector in accordance with a motion vector detection program.

When the motion vector detection device 1 according to the first embodiment, configured, as described above, detects the motion vector by the CPU 2 on the picture data made up of plural field pictures, it executes the motion vector detection program stored in the HDD 4 to execute the processing shown in the flowchart of FIG. 3.

Figure 4:
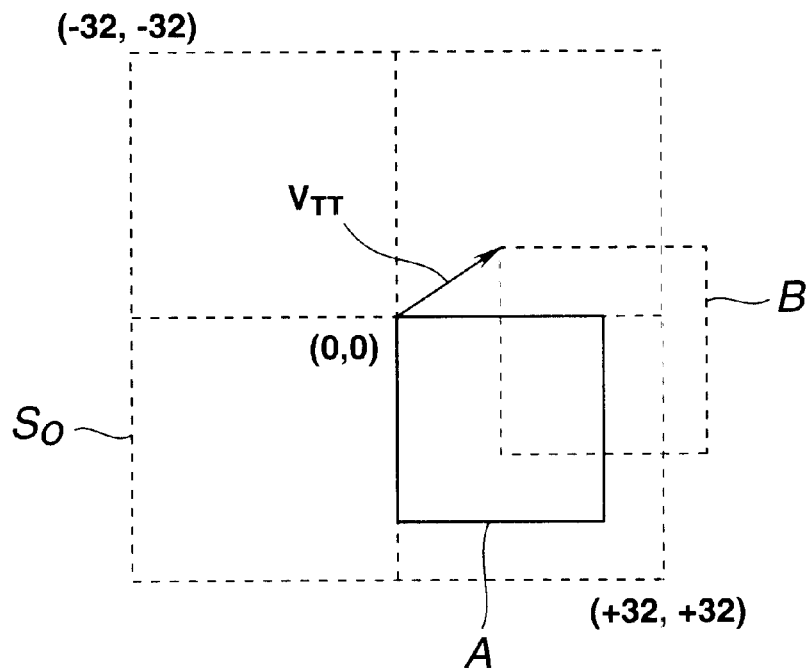
FIG. 4 illustrates the decision of the search area to search the motion vector $V_{TT}$.

First, at step S1, the CPU 2 performs the processing of setting the start point of search at (0, 0), as shown in FIG. 4. That is, the CPU 2 performs the processing of initializing the start point of the search area in executing the block matching for detecting the motion vector to (0, 0).

At the next step S2, the CPU 2 sets a search area S0 as a rectangular area, defined by the start point (0, 0) as center, and by points (−32, −32) and (+32, +32) as diagonal points. The search area S0 is used for searching the motion vector $V_{TT}$ used for motion compensating the top field picture $T_2$ using the top field picture $T_1$ as shown in FIG. 2. Meanwhile, at this step S2, the CPU 2 can set the size of the search area for detecting the motion vector $V_{TT}$ to an optional value that permits accurate detection of the motion vector.

At the next step S3, the CPU 2 performs the processing of detecting the motion vector $V_{TT}$ by performing block matching in the search area as defined at step S2. That is , the CPU 2 sets the top field picture $T_1$ and the top field picture $T_2$ as the above-mentioned reference field picture and target field picture, respectively, and uses the target block A of a pre-set number of pixels contained in the top field picture $T_1$ to perform block matching in the search area. Thus, the CPU 2 searches the reference block B contained in the top field picture $T_2$ to detect the motion vector $V_{TT}$.

At the next step S4, the CPU 2 proceeds to the detection of the motion vector $V_{BB}$, with the bottom field picture $B_1$ and the bottom field picture $B_2$ as the reference field picture and as the target field picture, respectively. At this time, the CPU 2 sets the starting point of searching the motion vector $V_{BB}$ at a coordinate e position of the distal end of the motion vector detected at the aforementioned step S3 ($h_{TT}$, $v_{TT}$). It is noted that, since the field-to-field distance between the target field picture and the reference field picture, and the field-to-field distance between the bottom field picture $B_1$ and the bottom field picture $B_2$, as used in detecting the motion vector $V_{TT}$, are equal to each other, the CPU 2 sets the start point of searching the motion vector $V_{BB}$ at the coordinate position ($h_{TT}$, $v_{TT}$) of the distant end of the motion vector $V_{TT}$, without elongating or contracting the distal end of the motion vector $V_{TT}$.

Figure 5:
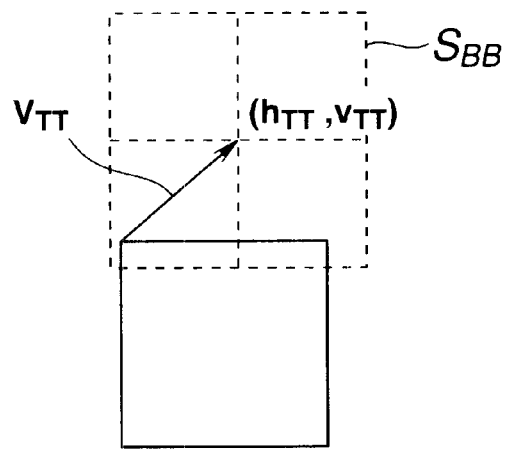
FIG. 5 illustrates the decision of a start point of searching the motion vector $V_{BB}$ using the motion vector $V_{TT}$ to decide the search area.

At the next step S5, the CPU 2 sets the search area $S_{BB}$, made up of a pre-set number of pixels, and which is centered about the coordinate position ($h_{TT}$, $v_{TT}$) as set at the aforementioned step S4, as shown in FIG. 5. The CPU 2 defines the search area as a rectangular area defined by the point ($h_{TT}$, $V_{TT}$) as the center and by points ($h_{TT}$−4, $v_{TT}$−4) and ($h_{TT}$+4), $v_{TT}$+4) as diagonal points. At this step S5, the CPU 2 can set the search area $S_{BB}$, used for detecting the motion vector $V_{BB}$, as being made up of an optional number of pixels.

At the next step S6, the CPU 2 performs the processing of detecting the motion vector $V_{BB}$ by performing block matching in the search area $S_{BB}$ as set at the aforementioned step S5, in the similar manner to the aforementioned step S3.

Figure 6:
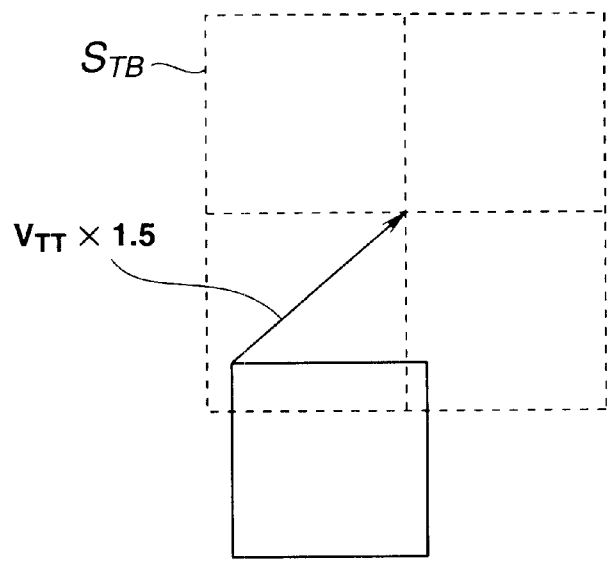
FIG. 6 illustrates the decision of a start point of searching the motion vector $V_{TB}$ using the motion vector $V_{TT}$ to decide the search area.
Figure 7:
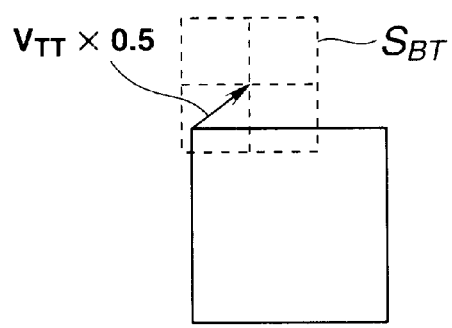
FIG. 7 illustrates the decision of a start point of searching the motion vector $V_{BT}$ using the motion vector $V_{TT}$ to decide the search area.

At the next step S7, the CPU 2 proceeds to detection of the motion vector $V_{TB}$, with the top field picture $T_1$ and the bottom field picture $B_2$ as the reference field picture and as the target field picture, respectively. At this time, the CPU 2 sets the start point of searching of the motion vector $V_{TB}$ at a coordinate position corresponding to the length of the motion vector $V_{TT}$ as detected at the aforementioned step S3, times 1.5, as shown in FIG. 6. That is, since the field-to-field distance between the top field picture $T_1$ and the top field picture $T_2$ and that between the top field picture $T_1$ and the bottom field picture $B_2$ is 1.5-tupled, the CPU 2 sets the start point of search for the motion vector $V_{TB}$ at (1.5$h_{TT}$, 1.5$v_{TT}$).

At the next step S8, the CPU 2 sets a search area $S_{TB}$, centered about the coordinate position (1.5$h_{TT}$, 1.5$v_{TT}$) as set at the aforementioned step S7 and which is made up of a number of pixels equal to 1.5 times that of the search area set at the aforementioned step S5. That is, the CPU 2 seta a rectangular area, having a coordinate (1.5$h_{TT}$, 1.5$v_{TT}$) as the center and having coordinates (1.5$h_{TT}$−6, 1.5$v_{TT}$−6) and ($h_{TT}$+6), ($v_{TT}$+6) as diagonal points, as a search area $S_{TB}$.

At the next step S9, the CPU 2 performs block matching, as in the aforementioned step S3, within the search area $S_{TB}$ as set at the aforementioned step S8, to detect the-motion vector $V_{TB}$.

At the next step S10, the CPU 2 proceeds to detect the motion vector $V_{BT}$, with the bottom field $B_1$ as a reference field picture and with a top field picture $T_2$ as a target field picture. The CPU 2 then proceeds to sets the start point of searching for the motion vector $V_{BT}$ at a coordinate position corresponding to 0.5 times the length of the motion vector $V_{TT}$ detected at the aforementioned step S3. That is, since the field-to-field distance between the top field picture $T_1$ and the top field picture $T_2$ and the field-to-field distance between the bottom field picture $B_1$ and the top field picture $T_2$ are 0.5-tupled, the CPU 2 proceeds to set the start point of searching of the motion vector $V_{BT}$ at the coordinate positions (0.5 $h_{TT}$, 0.5 $v_{TT}$).

At the next step S11, the CPU 2 sets search area $S_{BT}$ centered about the coordinate positions (0.5$h_{TT}$, 0.5 $v_{TT}$) as set at the aforementioned step S10 and which is made up of a number of pixels 0.5 times that of the search area as set at the aforementioned step S5. That is, the CPU 2 sets a rectangular area having the coordinate point (0.5$h_{TT}$, 0.5 $v_{TT}$) as a center and having coordinate points (0.5$h_{TT}$–2, 0.5$V_{TT}$–2) and ($h_{TT}$+2, $V_{TT}$+2) as diagonal points, as the search area $S_{BT}$.

At the next step S12, the CPU 2 proceeds to detect the motion vector $V_{BT}$ by performing block matching in the same way as at step S3 within the search area $S_{BT}$ as set at the aforementioned step S3.

As a result of the above processing, the CPU 2 acquires two motion vectors, which are the motion vectors for the top field $T_2$ as predicted from the relation of two field pictures, namely the top field $T_1$ and the bottom field picture $B_1$. The CPU2 selects the optimum motion vector from these two motion vectors to set it as the motion vector for the top field picture $T_2$. The CPU 2 similarly selects an optimum one of the motion vectors predicted from the two field pictures, namely the top field picture $T_1$ and the bottom field picture $B_1$, to set the selected motion vector as the motion vector for the bottom field $B_2$.

In the motion vector detection device 1, having the CPU 2, performing the above processing, according to the first embodiment of the present invention, the motion vector $V_{TT}$ is first detected as indicated at the aforementioned steps S1 to S3 and other motion vectors $V_{BB}$ $V_{BT}$ $V_{TB}$ then are detected, the distal end point of the motion vector $V_{TT}$ is set as the search start point, and block matching is performed in dependence upon the field-to-field distance to vary the search area in detecting the other motion vectors $V_{BB}$ $V_{BT}$ $V_{TB}$, so that the pixel size of the search area can be reduced by exploiting the correlation between the top field picture and the bottom field picture. Thus, with the present motion vector detection device 1, the processing volume in detecting the motion vector can be reduced by contracting the pixel size of the search area to shorten the processing time.

In the foregoing description of the processing of the CPU 2, the motion vector $V_{TT}$ is first detected and the search area is set in subsequently detecting the other motion vectors $V_{BB}$ $V_{BT}$ $V_{TB}$. It is however possible with the motion vector detection device 1 to detect one of the motion vectors $V_{TT}$, $V_{BB}$ $V_{BT}$ $V_{TB}$, and to vary the pixel size of the search area in detecting the other motion vectors in proportion to the field-to-field distance.

In the foregoing description of the processing by the CPU 2, the motion vector for each field picture is found using temporally previous field pictures. That is, in finding a motion vector for a top field picture T2, the motion vector $V_{TT}$ and the motion vector $V_{TB}$ are found using the top field T1 and the bottom B1. It is however possible to find only one of the motion vector $V_{TT}$ and the motion vector $V_{TB}$ for use as the motion vector for each field picture.

A motion vector detection device according to a second embodiment of the present invention is now explained. Similarly to the motion vector detection device 1 of the above-described first embodiment, the present motion vector detection device of the second embodiment has the configuration shown in FIG. 1.

The CPU 2 has an internal memory and performs block matching in accordance with a motion vector detection program to set search areas for detecting the motion vector. Specifically, the CPU sets a first search area, centered about a point indicated by a motion vector of a reference block contained in a reference frame temporally proximate to a reference frame, while setting a second search area centered about a point extended in proportion to the field-to-field or frame-to-frame distance between the target frame and the reference frame.

The CPU 2 generates, for each target block constituting the target frame, a flag indicating the search area for block matching, and stores the flag in the memory to detect the motion vector. The CPU 2 thus generates in the memory a map for verifying whether or not there exists a flag associated with the target frame.

In preparing the map, the CPU 2 sets "1" as a flag for performing block matching, while setting "0" as a flag for not performing block matching. The CPU 2 performs block matching in the search area, set as described above, as it refers to the map composed of flags.

Figure 8:
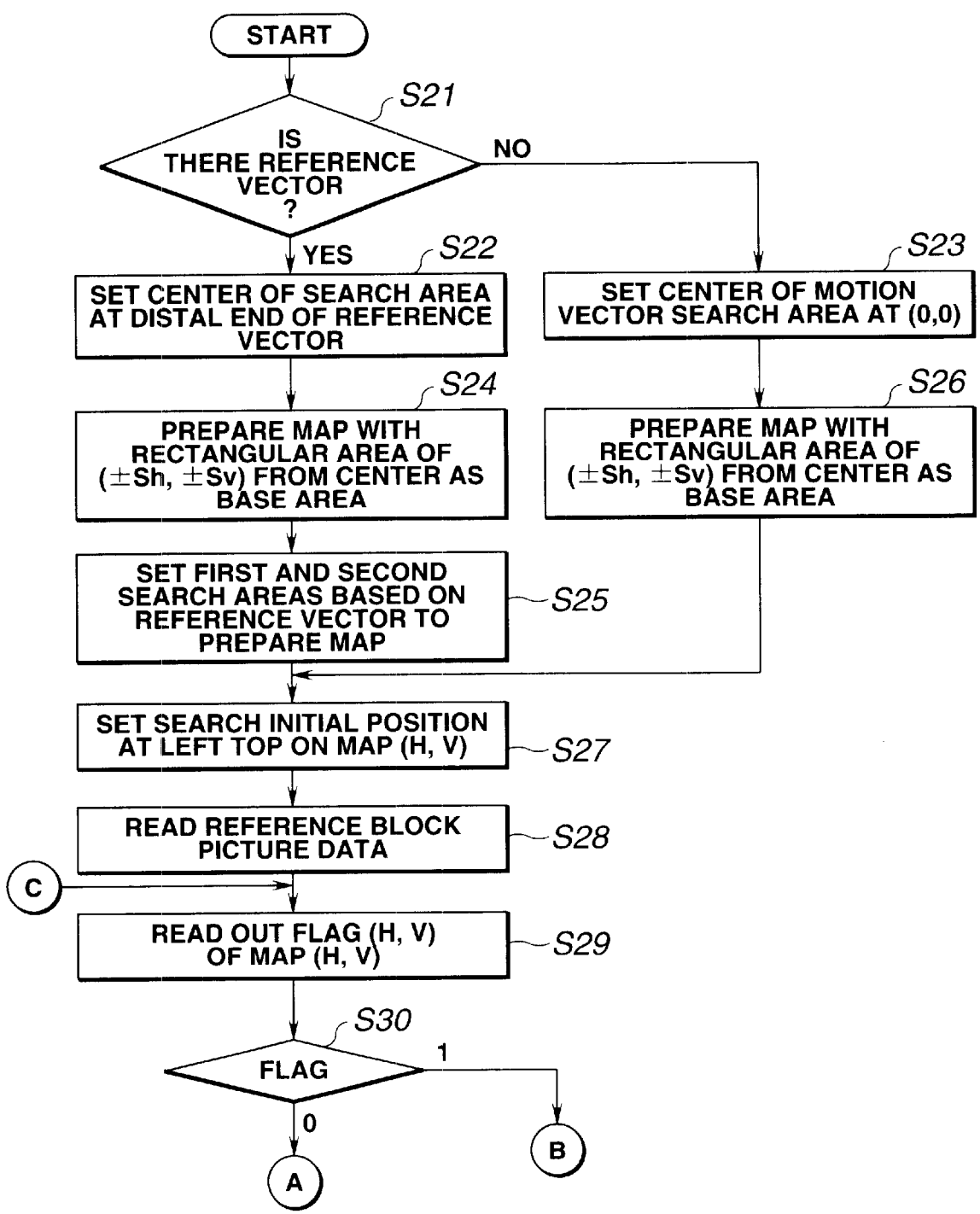
FIG. 8 is a flowchart for illustrating the processing of detecting a start point and a search area in searching the motion vector $V_{BT}$ using the motion vector $V_{TT}$ according to a first embodiment of the present invention.
Figure 9:
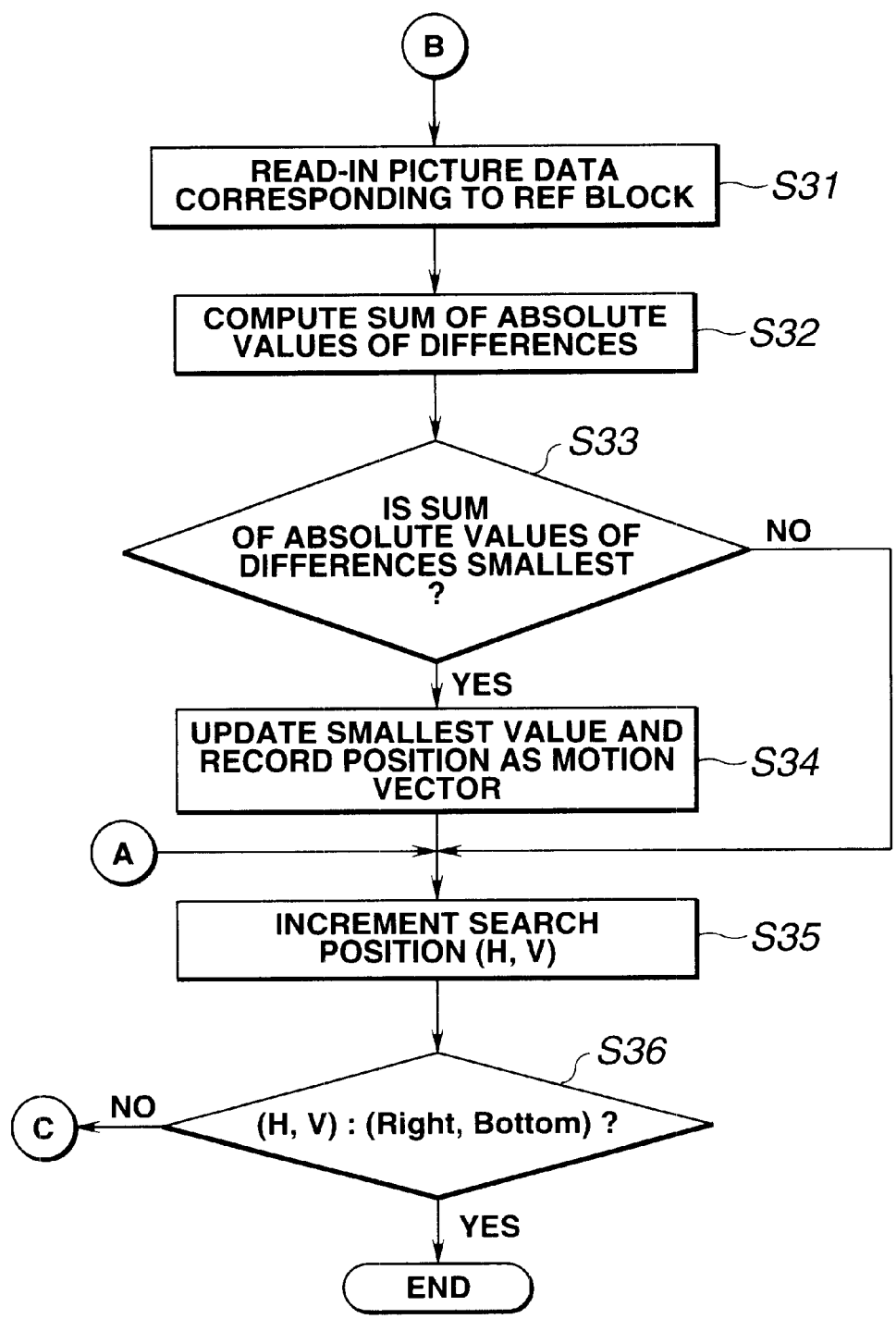
FIG. 9, continuing from FIG. 8, is a flowchart for illustrating the processing of detecting a start point and a search area in searching the motion vector $V_{BT}$ using the motion vector $V_{TT}$ according to the first embodiment of the present invention.

The processing by the CPU 2, provided in the present second embodiment of the motion vector detection device 1, is explained using the flowcharts of FIG. 8 and FIG. 9.

First, at step S21, the CPU 2 verifies whether or not the motion vector is present in a macro-block-based target block. If the CPU 2 finds that the motion vector exists in the target block, it proceeds to step S22 and, if otherwise, to step S23.

At the next step S22, the CPU 2 sets the center position of the search area at the distal end of the motion vector of the target block. That is, the CPU 2 sets a rectangular area of a pre-set number of pixels from the above-mentioned center position as a motion vector search area, that is as an area for preparing the map composed of flags indicating block matching.

Figure 10:
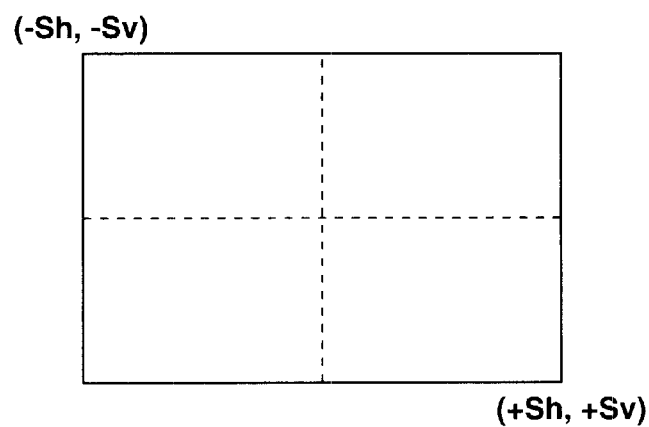
FIG. 10 illustrates the processing for formulating a map by the CPU.

At the next step S24, the CPU 2 sets, as a base area of the map composed of flags for storage in the memory, a rectangular area having the center position of the vector search area set at step S22 as the center position of the map and having (–Sh, –Sv) and (+Sh, +Sh) as diagonal points, as shown in FIG. 10. That is, the CPU generates in its internal memory a map made up of flags "1" and "0" indicating performing block matching and not performing block matching, respectively.

At the next step S25, the CPU 2 sets, as a first search area, an area of a pre-set number of pixels, centered about the distal end of the motion vector of the target block, while setting, as a second search area, an area centered about a point extended from the motion vector of the target block. At this time, the CPU 2 sets the position of the point extended from the motion vector of the reference block, responsive to the frame-to-frame distance between the target frame the motion vector of which is to be detected and the reference frame containing the reference block, and decides the size of the second search area centered about the point thus set. That is, the CPU 2 sets an area of a size proportionate to the distance between the target and reference frames as the size of the second search area. Responsive to the setting of the first and second search areas, the CPU 2 generates a flag for performing block matching. The CPU 2 also sets a connecting line interconnecting the first and second search areas and sets an area surrounded by the first search area, second search area and the connecting line as a motion vector search area and generates a flag.

Figure 11:
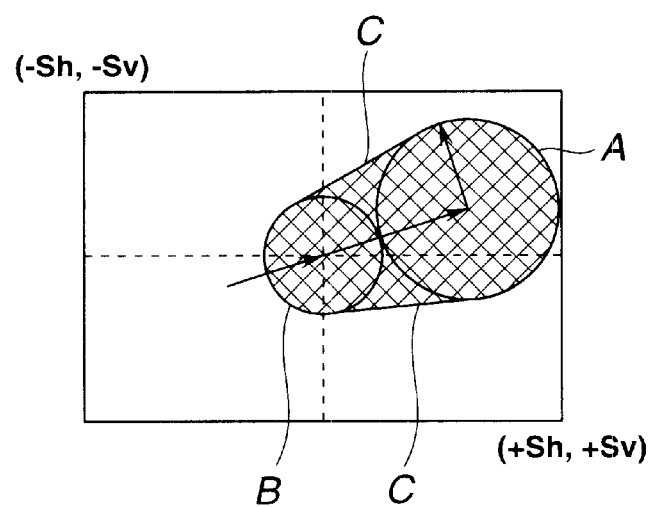
FIG. 11 illustrates an exemplary map formulated in a CPU memory.

The CPU 2 thus sets the first and second search areas as circular areas, while setting the second search area so as to be larger in radius responsive to the frame-to-frame distance, and mapping in the memory base area a flag indicating the motion vector search area surrounded by tangential lines drawn to the first and second search areas. In this manner, a map indicating the motion vector search area surrounded by the first search area A, second search area B and the connection lines is drawn in the memory. In FIG. 11, meshed and blank portions indicate the motion vector search area with the flag "1" and the area with the flag "0", respectively.

At the step S23, to which the CPU 2 proceeds if it is verified that there is no motion vector in the target block at step S21, the CPU 2 sets the center position of the motion vector search area at a coordinate position (0, 0) in the target block.

At the next step S26, the CPU 2 sets, as a base map area, a rectangular area having the center of the motion vector search area set at the aforementioned step S23 as the center position and having (−Sh, −Sv) and (+Sh, +Sh) as diagonal points, as a motion vector search area. The CPU 2 then proceeds to step S27. That is, since it has been determined at step S21 that no motion vector is present in the reference block, the CPU 2 formulates a memory map by setting, as a motion vector search area, a rectangular area having the center of the motion vector search area as the center position and having (−Sh, −Sv) and (+Sh, +Sh) as diagonal points At step S27, the CPU 2 designates a top left coordinate position of the base area in the map prepared at step S25 or S26 as initial positions. That is, the CPU 2 starts the block matching search position in detecting the motion vector at the top left coordinate (H, V) in the base area, where H and V denote variables indicating the coordinate positions in the map.

At the next step S28, the CPU 2 reads picture data of the macro-block-based target block from the target frame the motion vector of which is to be detected.

At the next step S29, the CPU 2 reads out from the map stored in the memory a flag at the coordinate (H, V).

At the next step S30, the CPU 2 decides whether the flag read out at the aforementioned step S29 is "1" or "0". That is, the CPU 2 decides, using the pixel of the target block associated with the coordinate position of the map stored in the memory and the pixel of the reference block, whether or not the block matching is to be performed. If the flag is "1", that is if the block matching is to be performed, the program moves to step S31. If the flag is "0", that is if block matching is not performed, the program moves to step S35 shown in FIG. 9.

At step S31, the CPU 2 reads out from the memory 3 picture data of the reference block corresponding to the coordinate (H, V) from the reference frame.

At the next step 32, the CPU 2 compares picture data of the target block for the coordinate (H, V) read out at the aforementioned step S28 to picture data of the reference block for the coordinate (H, V) inputted at the aforementioned step S31 to compute the differences between the respective pixels of the target block and those of the reference block to compute the sum of the absolute difference values.

At the next step S33, the CPU 2 decides whether or not the sum of the absolute values of the differences as found at the aforementioned step S32 is the smallest. If the CPU 2 verifies that the sum of the absolute different values is the smallest, the CPU 2 proceeds to step S34 to store the coordinate (H, V) as the smallest sum of the absolute different values. If otherwise, the CPU 2 proceeds to step S35. The CPU 2 thus detects the motion vector.

At step S35, the CPU 2 increments the coordinate (H, V) of the map to specify the next pixel. At step S36, the CPU 2 verifies whether or not the map coordinate is right bottom, that is whether or not the coordinate is (right, bottom). If the CPU 2 verifies that the map coordinate is not right bottom, the CPU 2 performs the processing as from step S29 on the pixel specified at step S35. If the CPU 2 verifies that the map coordinate is right bottom, the CPU 2 terminates the processing of motion vector detection for the target block.

If the motion vector detection device 1 according to the present second embodiment, having the CPU 2 performing the above processing, detects the motion vector for a given target block, it determines an area in which to perform block matching using the motion vector of the reference block at step S25, and repeats the processing from step S29 to step S36 to effect block matching only for the coordinates for which the flag has been generated. The CPU 2 detects the motion vector of the target block using the coordinate of the reference block corresponding to the smallest sun of the absolute difference values.

Therefore, the motion vector detection device 1 according to the second embodiment sets the first and second search areas, using the motion vector of the reference block, and effectuates block matching only for a search area including the first and second search areas, so that the search area can be smaller than if the search area is set without employing the reference block. It is thus possible with the second embodiment of the motion vector detection device 1 to reduce the number of times of block matching and to reduce the processing volume for motion vector detection significantly.

Moreover, with the present second embodiment of the motion vector detection device 1, the processing volume and hence the processing time may be reduced as high accuracy in motion vector detection processing is maintained.

If the motion vector detection program for setting the search area by exploiting the correlation between the top and bottom field pictures, as explained in the first embodiment, is used in conjunction, it is possible for the CPU 2 to reduce the search area further to reduce the number of times of block matching.

Figure 12:
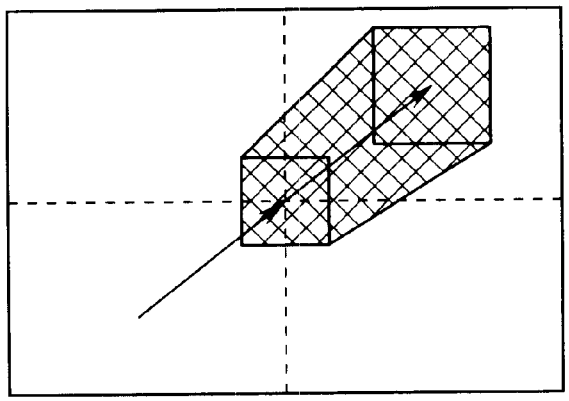
FIG. 12 illustrates another exemplary map formulated in a CPU memory.

The processing by the second embodiment of the motion vector detection device 1 has been explained by taking an example in which, at step S25, the first and second search areas A and B are circular, as shown in FIG. 11. It is however possible for the motion vector detection device 1 to set the first and second search areas as rectangular areas, as shown in FIG. 12, and to detect the motion vector within a search area surrounded by the first and second search areas and straight lines interconnecting the first and second search areas. By having the first and second search areas as rectangular areas, it is possible for the motion vector detection device 1 to diminish the processing volume for setting the search area in comparison with that if the circular search area is to be set, thus further reducing the processing time.

Figure 13:
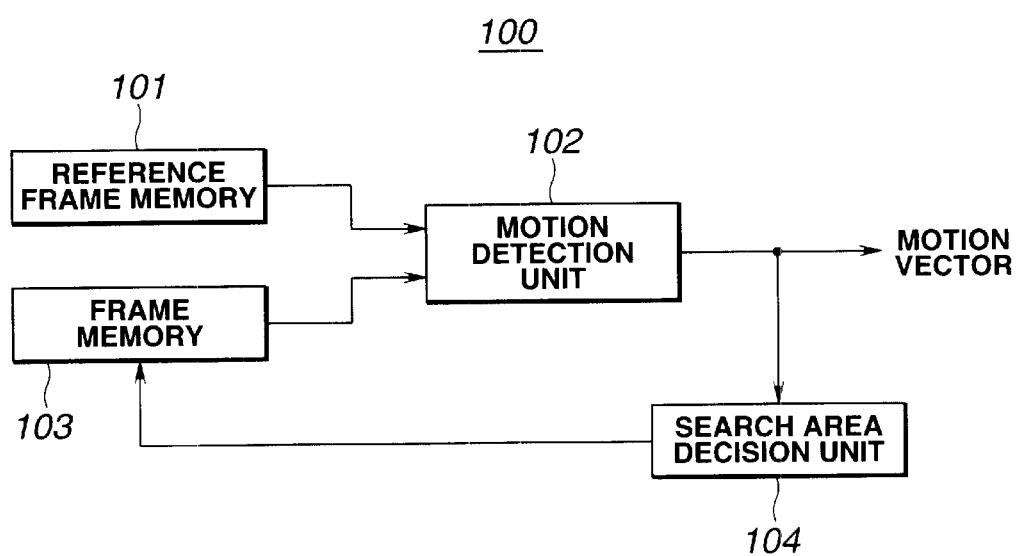
FIG. 13 is a block diagram showing the structure of a motion vector detection apparatus according to a second embodiment of the present invention.

As the above-described second embodiment of the motion vector detection device 1, as a functional block, a motion vector detection device 100 shown in FIG. 13 is explained.

The motion vector detection device 100 includes a target frame memory 101 for storing picture data of a reference frame for finding the motion vector. In this target frame memory 101, picture data of the target frame, stored in a motion detection unit 102, is read as, for example, a macro-block-based target block.

The motion vector detection device 100 also includes a frame memory 103 in which to store picture data of the target frame the motion vector of which is to be found. In this target frame memory 101, picture data of the target frame stored by the motion detection unit 102 is read as, for example, a macro-block-based target block.

This motion vector detection device 100 includes a reference frame memory 103 in which to store picture data of the target frame the motion vector of which is to be found. The reference frame memory 103 is responsive to a reference block readout control signal from a search area decision block 104 to output picture data of the reference frame to the motion detection unit 102 as, for example, a macro-block-based reference block.

The motion detection unit 102 performs block matching, using the target block from the target frame memory 101 and the reference block from the reference frame memory 103 to detect the motion vector for the target block. The block matching is the processing of dividing a target frame and a reference frame into small-sized rectangular areas, each being of a pre-set number of pixels (target and reference blocks) and of detecting the motion vector on the block basis. The sizes of the target and reference blocks may, for example, be 8 horizontal pixels by 8 vertical pixels or 16 horizontal pixels by 16 vertical pixels. The motion detection unit 102 outputs the motion vector, detected for the target block, to outside and to the search area decision block 104.

The search area decision block 104 determines a motion vector search area, using a motion vector from the motion detection unit 102 as a motion vector of the reference block, in order to detect the motion vector of the target block by performing block matching in the motion detection unit 102. Specifically, the search area decision block 104 determines the first search area, centered about a point indicating the motion vector of the reference block, by performing computations employing the motion vector of the reference block, while also determining the second search area, centered about a point extended from the motion vector of the reference block, by performing commutations in dependence upon the frame-to-frame distance between the target and reference frames. The search area decision block 104 generates reference block readout control signal for the motion vector search area including the first and second search areas, and causes the reference frame memory 103 to output the reference block contained in the motion vector search area to the motion detection unit 102.

The search area decision block 104 has an internal memory and determines the respective search areas, while generating a flag indicating an area subjected to block matching, from one target block of the target frame to another. The generated flag is stored in the memory. This generates in the memory a map for giving a decision as to whether or not there exists a flag associated with the target frame. The search area decision block 104 prepares a map with "1" and "0" as a flag for performing block matching and as a flag for not performing block matching, respectively. When performing block matching in the motion detection unit 102, the search area decision block 104 refers to a map made up of flags to generate reference block readout control signal to output the generated signal to the reference frame memory 103.

The processing of the motion vector detection device 100 in generating the flag to detect the motion vector for a target block is similar to that shown in the flowcharts of FIGS. 8 and 9. However, reference again had to FIGS. 8 and 9 for illustrating the processing of the motion vector detection device 100 shown information FIG. 13.

First, at step S21, the search area decision block 104 checks whether or not there exists the motion vector in a macro-block-based reference block from the reference frame memory 103. If the search area decision block 104 decides that there exists the motion vector, the search area decision block 104 proceeds to step S22. If the search area decision block 104 decides that there is no motion vector, it proceeds to step S23.

At the next step S22, the search area decision block 104 sets the center position of the motion vector search area at the distal end position of the motion vector of the reference block.

At the next step S24, the search area decision block 104 sets, as a base area of the map composed of flags for storage in the memory, a rectangular area having the center position of the vector search area set at step S22 as the center position of the map and having (−Sh, −Sv) and (+Sh, +Sh) as diagonal points. That is, the CPU generates in its internal memory a map made up of flags "1" and "0" indicating performing block matching and not performing block matching, respectively.

At the next step S25, the CPU 2 sets, as a first search area, an area of a pre-set number of pixels, centered about the distal end of the motion vector of the target block, while setting, as a second search area, an area centered about a point extended from the motion vector of the reference block depending on the frame-to-frame distance. Responsive to the setting of the first and second search areas, the search area decision unit 104 generates a flag for performing block matching. The search area decision unit 104 also sets a connecting line interconnecting the first and second search areas and sets an area surrounded by the first search area, second search area and the connecting line as a motion vector search area and generates a flag.

The search area decision unit 104 thus sets the first and second search areas as circular areas, while setting the second search area so as to be larger in radius responsive to the frame-to-frame distance, and mapping in the memory base area a flag indicating the motion vector search area surrounded by tangential lines drawn to the first and second search areas. In this manner, a map indicating the motion vector search area surrounded by the first search area A, second search area B and the connection lines is drawn in the memory. In FIG. 11, meshed and blank portions indicate the motion vector search area with the flag "1" and the area with the flag "0", respectively.

At the step S23, to which the search area decision unit 104 proceeds if it is verified that there is no motion vector in the target block at step S21, the search area decision unit 104 sets the center position of the motion vector search area at a coordinate position (0, 0) in the target block.

At the next step S26, the search area decision unit 104 sets, as a base map area, a rectangular area having the center of the motion vector search area set at the aforementioned step S23 as the center position and having (−Sh, −Sv) and (+Sh, +Sh) as diagonal points, as a motion vector search area. The search area decision unit 104 then proceeds to step S27. That is, since it has been determined at step S21 that no motion vector is present in the reference block, the search area decision unit 104 formulates a memory map by setting, as a motion vector search area, a rectangular area having the center of the motion vector search area as the center position and having (−Sh, −Sv) and (+Sh, +Sh) as diagonal points At step S27, the search area decision unit 104 designates a top left coordinate position of the base area in the map prepared at step S25 or S26 as initial positions. That is, the search area decision unit 104 starts the block matching search position in detecting the motion vector by the motion detection unit 102 at the top left coordinate (H, V) in the base area, where H and V denote variables indicating the coordinate positions in the map.

At the next step S28, the search area decision unit 104 reads picture data of the macro-block-based target block from the target frame the motion vector of which is to be detected.

At the next step S29, the search area decision unit 104 reads out from the map stored in the memory a flag at the coordinate (H, V).

At the next step S30, the search area decision unit 104 decides whether the flag read out at the aforementioned step S29 is "1" or "0". That is, the search area decision unit 104 decides, using the pixel of the target block associated with the coordinate position of the map stored in the memory and the pixel of the reference block, whether or not the block matching is to be performed. If the flag is "1", that is if the block matching is to be performed, the program moves to step S31. If the flag is "0", that is if block matching is not performed, the at program moves to step S35 shown in FIG. 9.

At step S35, the search area decision block 104 specifies the next pixel, by incrementing the map coordinate (H, V). At step S36, the search area decision block 104 decides at step S36 whether or not the map coordinate is right bottom (right, bottom). If the search area decision block 104 finds that the map coordinate is not right bottom, it performs processing as from step S29 on the pixels designated at step S35. If the search area decision block 104 finds that the map coordinate is right bottom, it terminates the processing of detecting the motion vector for the target block.

At step S31, the search area decision block 104 performs control to output a reference block readout control signal to the reference frame memory 103 to output from the reference frame picture data of the reference block for the coordinate (H, V) from the reference frame from the reference frame memory 103 to the motion detection unit 102.

At the next step 32, the motion detection unit 102 compares picture data of the target block for the coordinate (H, V) read out at the aforementioned step S28 to picture data of the reference block for the coordinate (H, V) inputted at step S31 to compute the differences between the respective pixels of the target block and those of the reference block to compute the sum of the absolute difference values.

At the next step S33, the motion detection unit 102 decides whether or not the sum of the absolute values of the differences as found at step S32 is the smallest. If the motion detection unit 102 verifies that the sum of the absolute different values is the smallest, the motion detection unit 102 proceeds to step S34 to store the coordinate (H, V) as the smallest sum of the absolute different values. The motion detection unit 102 thus detects the motion vector.

At the next step S35, the search area decision block 104 specifies the next reference block in the base area and checks whether or not the coordinate of the reference block specified at step S36 is right bottom (right, bottom).

If the motion vector detection device 100 detects the motion vector for a given target block, it determines an area in which to perform block matching, using the motion vector of the reference block at step S25, and repeats the processing from step S29 to step S36 to effect block matching only for the coordinates for which the flag has been generated. The CPU 2 detects the motion vector of the target block using the coordinate of the reference block corresponding to the smallest sum of the absolute difference values.

In the motion vector detection device 100, performing the above processing, the first search area A and the second search area B are set, using the motion vector of the reference block, as explained in.connection with the above step S25, and the block matching is performed only by the motion vector search area containing the first search area A and the second search area B, so that the search area can be smaller than if the search area is set without employing the reference block.

In the above processing by the motion vector detection devices 1, 100 according to the second embodiment of the present invention, the first and search areas may be rectangular areas as shown in FIG. 12, as in FIG. 11, to perform the processing of detecting the motion vector in the motion search area surrounded by the first and second search areas and a straight line interconnecting the two search areas.

A third embodiment for realizing the third object of the present invention is explained. In the third embodiment, the motion vector detection device 1 configured as shown in FIG. 1 is used.

The motion vector detection device of the third embodiment detects the motion vector by setting the search area by exploiting the high correlation in the motion vector of pixel blocks neighboring to each other.

In this case, when finding the motion vector for a field picture or a frame picture, the CPU 2 sets a search area for searching the motion vector and performs block matching in the search area in terms of a 8×8 macroblock as a unit to detect the motion vector. Specifically, the CPU 2 splits a frame picture on the macro-block basis, in accordance with a motion vector detection program, and sets a search area for block matching, using motion vectors of neighboring macroblocks.

Figure 14:
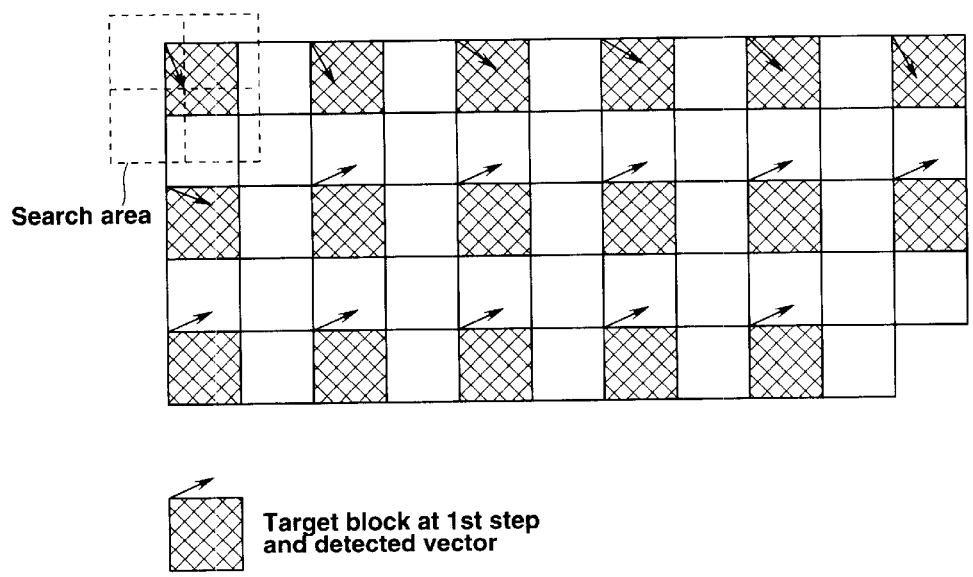
FIG. 14 illustrates division of a frame picture into macroblocks when a CPU provided in a motion vector detection device according to a third embodiment the present invention performs the processing for detecting the motion vector.

In detecting the motion vector, the CPU 2 detects the motion vector by block matching in a pre-set search area for every other macroblock indicated by meshed portions in FIG. 14. The CPU 2 then computes the search area, using the motion vector for the macro-block of the meshed portion, and performs block matching in the search area to detect the motion vector for the macro-block of the blank portion in FIG. 14.

Figure 15:
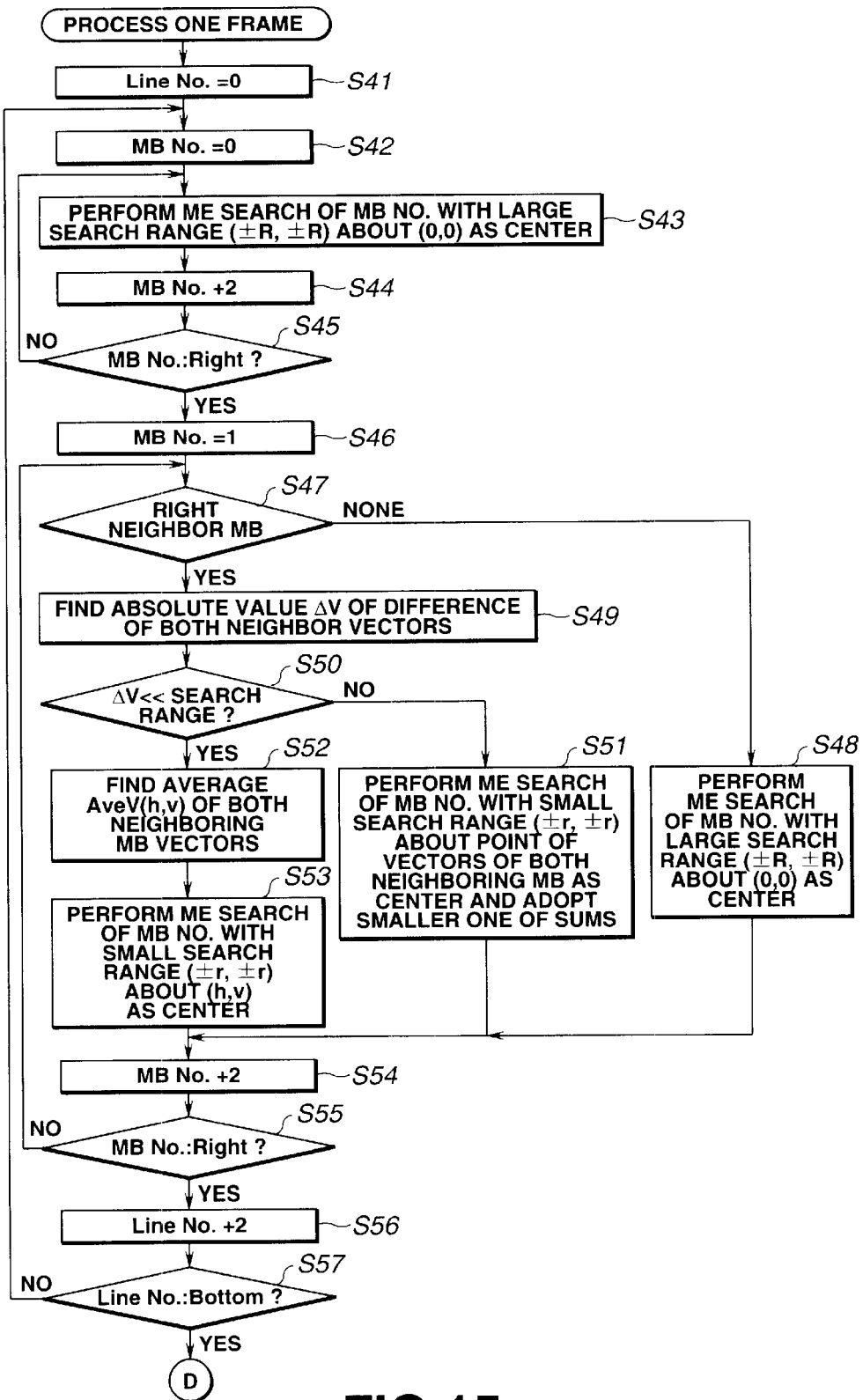
FIG. 15 is a flowchart showing the processing sequence for a CPU provided in a motion vector detection device according to a third embodiment of the present invention to detect the motion vector in accordance with a motion vector detection program.
Figure 16:
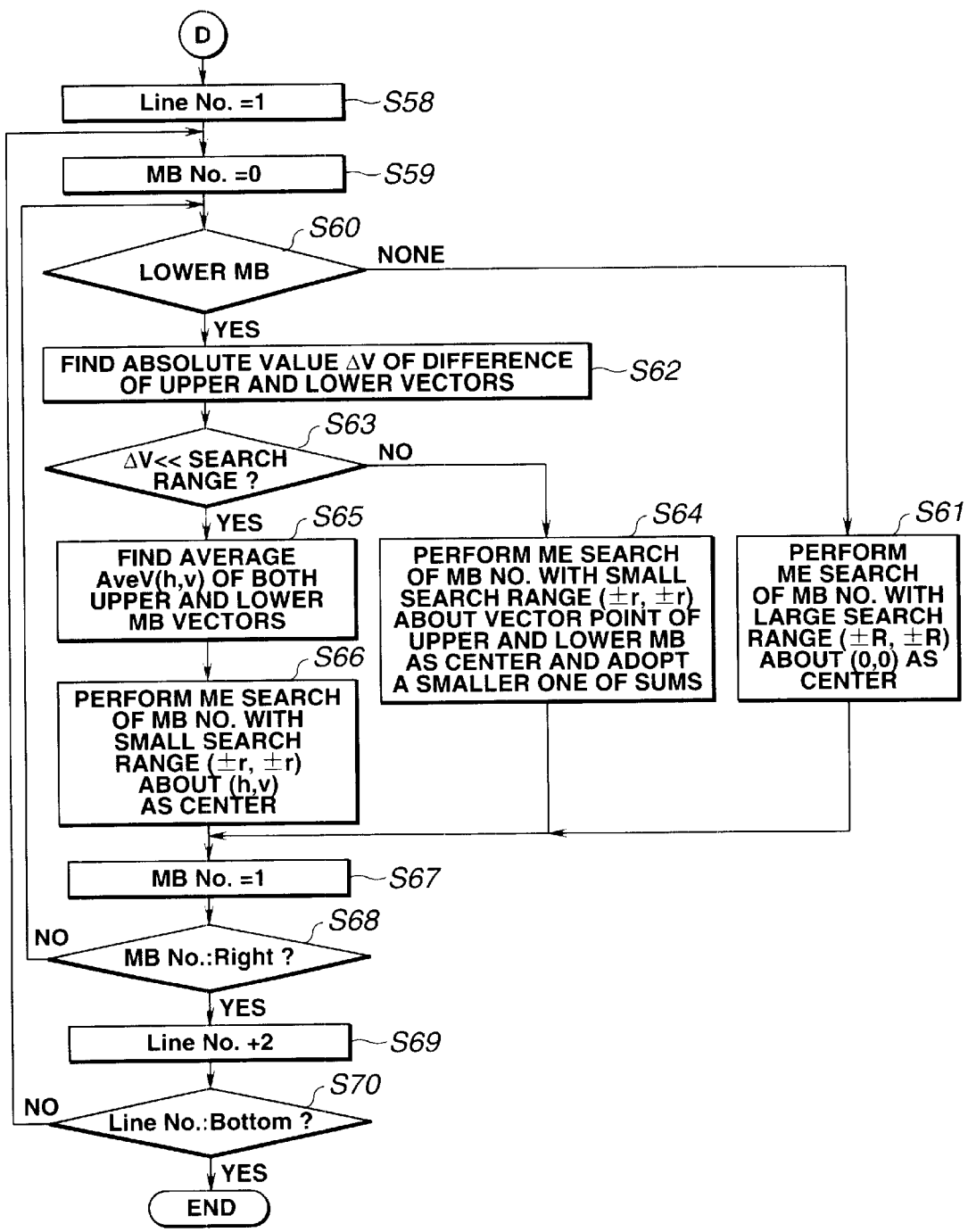
FIG. 16, continuing to FIG. 15, is a flowchart showing the processing sequence for the CPU provided in the motion vector detection device according to the third embodiment of the present invention to detect the motion vector in accordance with the motion vector detection program.

When detecting the motion vector for picture data of a frame picture by the CPU 2, the motion vector detection device 1 executes the motion vector detection program stored in the HDD 4 to perform the processing shown by the flowchart of FIGS. 15 and 16.

Figure 17:
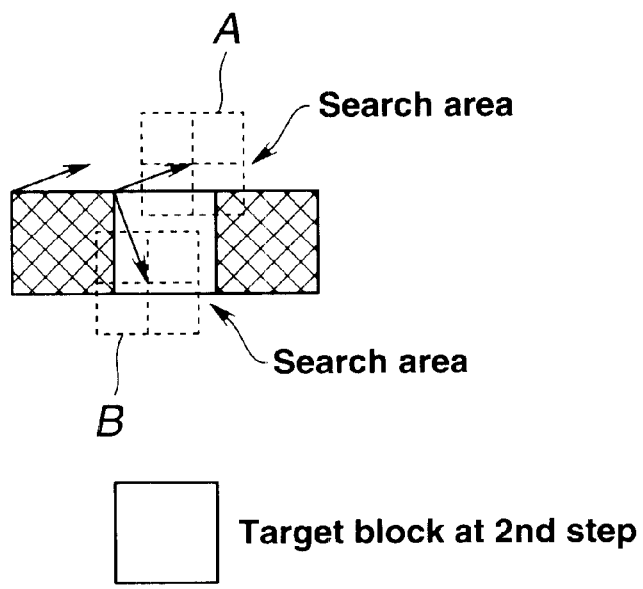
FIG. 17 illustrates setting a search area to detect the motion vector using a motion vector of a neighboring macroblock when the neighboring macroblock in the horizontal direction indicates different directions.

First, at step S41, the CPU 2 specifies the line number (No.) by specifying the address of a line of plural macro-blocks arrayed horizontally, as shown in FIG. 17. It is noted that the CPU 2 specifies the number of the line "0" lying at an uppermost position among plural lines each of which is composed of horizontally arranged macroblocks. The line number is 0, 1, 2, . . . , bottom, looking from the top.

At the next step S42, the CPU 2 specifies the number "0" of the macro-block, the motion vector for which is to be detected, in the line "0" specified at the aforementioned step S41. The numbers of the plural macro-blocks, constituting respective lines, is 0, 1, 2, . . . , right, looking from the left end towards the right end.

At the next step S43, the CPU 2 sets the search area for the macroblock having the number specified at the aforementioned step S42. The CPU 2 here sets a search range R made up of a pre-set number of pixels. Specifically, the CPU 2 sets a rectangular area, made up of 32×32 pixels, as the search range R. The CPU 2 performs block matching, using associated macroblocks of temporally previous and future frame pictures frame pictures, in the search area made up of a pre-set number of pixels, to detect the motion vector.

At the next step S44, the CPU 2 specifies macro-blocks offset by two to the left and right in the horizontal direction from the macroblock the motion vector of which has been detected at the aforementioned step S43.

Then, at step S45, the CPU 2 checks whether or not the macroblock specified at the aforementioned step S44 is positioned at the right end of the frame picture. When the CPU 2 verifies that the specified macroblock is at the right end of the frame picture, it advances to step S46 and, if otherwise, it reverts to step S43. That is, the CPU 2 performs the processing shown at the aforementioned steps S43 to S45 to detect the motion vector in the pre-set search area explained in connection with the step S43 every two vectors from the leftmost macroblock towards the right end of the specified line.

At the next step S46, the CPU 2 performs the processing the macroblock having the number "1" neighboring to the right side of the macroblock having the number "0" as specified at the aforementioned step S42.

At the next step S47, the CPU 2 checks whether or not there is the macroblock neighboring to the right side of the macroblock having the number specified at the aforementioned step S46 or at step S54 as later explained. If the CPU 2 verifies that there is no macroblock neighboring to the right side of the macroblock bearing the specified number, it advances to step S48 and, if otherwise, to step S49.

At step S48, the CPU 2 sets the above-mentioned pre-set search area at the aforementioned step S43 for the macroblock decided at step S47 to have no right-side neighbor, and performs the block matching in the search area to detect the motion vector. The CPU 2 then proceeds to step S54.

On the other hand, the CPU 2 at step S49 computes the difference of the motion vectors of both side macroblocks neighboring to the macroblock specified at the step S46 or S54, and computes the absolute value ΔV of the motion vector differences. It is noted that the absolute value ΔV of the motion vector differences assumes a smaller value if the directions pointed by the motion vectors of the both neighboring macroblocks are substantially equal to each other, while assuming a value which becomes the larger the more the directions pointed by the motion vectors of the both neighboring macroblocks deviate from each other.

At the next step S50, the CPU 2 checks whether or not the absolute value ΔV of the motion vector differences, obtained at the aforementioned step S49, is sufficiently larger than the search range r. It is noted that "r" is an optional value and the search range r means a rectangular area having points (−r, −r) and (+r, +r) as diagonal points. The rectangular defined by the search range R is smaller in area than the rectangular area defined by the search range R at the aforementioned step S43 and is, for example, a rectangular area made up of, for example, 6×6 pixels. If the absolute value ΔV of the motion vector differences is sufficiently larger than the search range r, that is if the directions pointed by the respective motion vectors of the neighboring macroblocks deviate from each other, the CPU 2 proceeds to step S51. If the absolute value ΔV of the motion vector differences is not sufficiently larger than the search range r, that is if the directions pointed by the respective motion vectors of the neighboring macroblocks deviate are subsequently equal to each other, the CPU 2 proceeds to step S52.

At step S51, the CPU 2 sets the roots of the motion vectors of both side macroblocks in the horizontal direction neighboring t the macroblock specified at step S46 or S54 at the left upper coordinate position of the macroblock specified as shown in FIG. 17, while setting the search areas A and B defined by the search range r centered about the point ends. The CPU 2 then performs block matching in the respective search areas A and B to detect the motion vector. The CPU 2 then advances to step S54.

Figure 18:
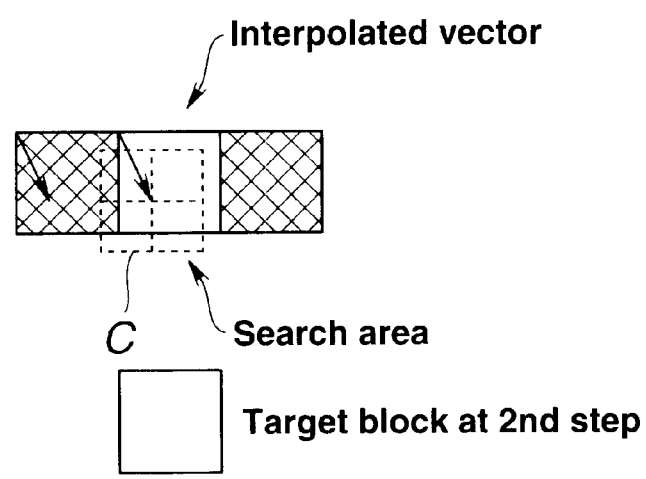
FIG. 18 illustrates setting a search area to detect the motion vector using a motion vector of a neighboring macroblock when the neighboring macroblock in the horizontal direction indicates substantially the same direction.

At step S52, the CPU 2 calculates the average motion vector AveV(h, v), as shown in FIG. 18, using the respective motion vectors for both side macroblocks in the horizontal direction neighboring to the macroblock specified at step S6 or at step S54.

At the next step S53, the CPU 2 sets a rectangular search area C, centered about the coordinate position (h, v) pointed by the distal end of the average motion vector AveV(h, v) and having the points (−r, −r) and (+r, +r) as diagonal points. The CPU 2 then performs block matching in the as-set search area C to detect the motion vector for the macroblock specified at step S46 or step S54.

At the next step S54, the CPU 2 increments the number of the macroblock by two towards right in the horizontal direction from the macroblock the motion vector of which has been detected at the aforementioned step S53.

At the next step S55, the CPU 2 checks whether or not the macroblock having the number specified at the aforementioned step S54 is located at the rightmost end of the line in question. If the CPU 2 verifies that the specified macroblock is at the rightmost end of the line in question, it advances to step S56 and, if otherwise, it reverts to step S47. That is, the CPU 2 repeats the processing of the aforementioned steps S42 to S55 to detect motion vectors for the totality of macroblocks making up the line in question.

At step S56, the CPU 2 performs the processing of incrementing the line number by two towards the bottom as from the line processed by the above-mentioned steps S43 to S55 to specify the new line.

At the next step S57, the CPU 2 checks whether or not the number of the line specified at the aforementioned step S56 is the bottom. If the CPU 2 verifies that the specified line is the bottom line, it advances to step S58 shown in FIG. 16. If otherwise, the CPU 2 reverts to step S42 to perform the processing of steps S42 to S55 on the specified line. That is, the CPU 2 performs the processing of steps S41 to S57 to perform the processing indicated by steps S42 to S55 every two lines from the line bearing the number "0" of the frame picture towards its bottom.

At the next step S58, the CPU 2 specifies the numbers of the lines of plural macroblocks arrayed in the vertical direction as shown in FIG. 14. It is noted that the CPU 2 specifies the number "1" lying next to the uppermost line among the plural lines made up of macroblocks arrayed in the horizontal direction.

At the next step S59, the CPU 2 specifies the number "0" of the macroblock, the motion vector of which is to be detected, in the line "1" specified at the aforementioned step S58.

At the next step S60, the CPU 2 verifies whether or not there is any macroblock below the macroblock specified at the aforementioned step S59. If the CPU 2 verifies that there is no macroblock below the specified macroblock, the CPU 2 advances to step S61. If the CPU 2 verifies that there is a macroblock below the specified macroblock, it advances to step S62.

At step S61, the CPU 2 sets, for the macroblock for which it had been decided at the aforementioned step S60 that there is no macroblock in its lower neighboring side, a search area of a search area R at the aforementioned step S43, and executes block matching in the search area to detect a motion vector. The CPU 2 then advances to step S67.

On the other hand, the CPU 2 calculates at step S62, the difference of the motion vector of the macroblock neighboring in the vertical direction to the macroblock specified at the aforementioned step S59 or at step S67, as later explained, to find an absolute value ΔV of the difference.

At the next step S63, the CPU 2 checks whether or not the absolute value ΔV of the difference calculated at the aforementioned step S62 is larger than the search range r. If the absolute value ΔV of the difference is smaller than the search range, the CPU 2 proceeds to step S65 and, if the absolute value ΔV of the difference is not smaller than the search range, the CPU 2 proceeds to step S64.

Figure 19:
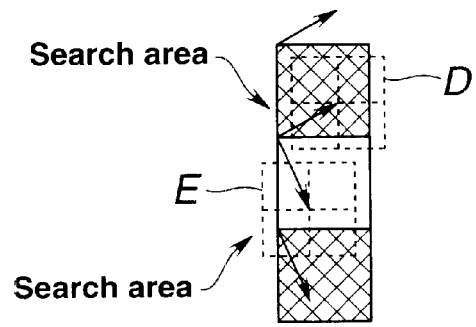
FIG. 19 illustrates setting a search area to detect the motion vector using a motion vector of a neighboring macroblock when the neighboring macroblock in the vertical direction indicates different directions.
Figure 19:
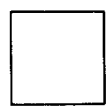

At step S64, the CPU sets each motion vector for each macroblock neighboring in the vertical direction to the macroblock specified at the aforementioned step S59 or at step S67 as later explained at a left top coordinate position of the macroblock specified as shown in FIG. 19 and sets search ranges D, E defined by the search range r about a point indicated by the indicated point as the center. The CPU 2 performs block matching in the search areas D and E to detect the motion vector.

Figure 20:
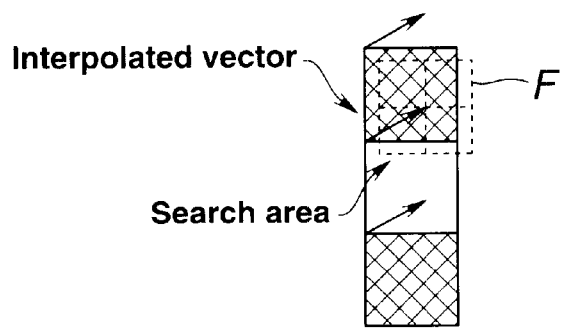
FIG. 20 illustrates setting a search area to detect the motion vector using a motion vector of a neighboring macroblock when the neighboring macroblock in the vertical direction indicates substantially the same direction.
Figure 20:

At step S65, the CPU 2 calculates the average motion vector AveV(h, v), as shown in FIG. 20, using respective motion vectors for macroblocks neighboring in the vertical direction to the macroblock specified at the steps S59 or S67.

At the next step S66, the CPU 2 sets a rectangular search area F, centered about the coordinate position (h, v) indicated by the distal end of the average motion vector AveV(h, v) and having points (−r, −r), (+r, +r) as diagonal points. The CPU 2 performs block matching in the as-set search area to detect the motion vector for the macroblock specified at step S59 or S67.

At the next step S67, the CPU 2 increments the number by one towards right in the horizontal direction from the macroblock the motion vector of which has been found art the aforementioned step S66.

At the next step S68, the CPU 2 checks whether or not the macroblock of the number specified by the aforementioned step S67 is at the rightmost end of the line in question. If the CPU 2 finds that the specified macroblock is at the rightmost end of the line in question, it advances to step S69 and, if otherwise, it reverts to step S60. That is, the CPU 2, repeating the processing of the aforementioned step S60 to step S68, detects the motion vector for the totality if macroblock constituting the line being processed.

At step S69, the CPU 2 proceeds to specify a new line incremented by two towards the lower side as from the line for which the processing of the steps S59 to S68 has been executed.

At the next step S70, the CPU 2 verifies whether or not the number of the line specified at the aforementioned step S69 is the bottom line. If the CPU 2 finds that the specified line is the bottom line, it terminates the processing. If the CPU 2 finds that the specified line is not the bottom line, it reverts to step S59 to perform the processing shown at the aforementioned steps S42 to S68 on the specified line. That is, the CPU 2, performing the processing of the steps S58 to S70 to execute the processing shown in the aforementioned steps S59 to S68 every two numbers from the line bearing the number "0" to the bottom line along the vertical direction of the frame picture.

The motion vector detection device 1, according to the above-described third embodiment, executes the processing shown at steps S41 to S57, to detect the motion vectors for the totality of macro-blocks in the specified line arrayed in the horizontal direction. The motion vector detection device 1 also executes the processing shown at steps S58 to S70 to specify lines not processed by the above-described steps S41 to S57 and detects motion vectors using macroblocks neighboring in the vertical direction to detect the motion vector for the totality of macro-blocks constituting the frame picture.

Thus, the motion vector detection device of the present third embodiment, performing the processing shown at step S43, performs block matching in a search area of a pre-set pixel size for certain macroblocks constituting the frame picture to detect the motion vector, while performing block matching for the remaining macroblocks in a search area of the pixel size smaller than the pre-set pixel size by having reference to the motion vector of the neighboring macroblock to detect the motion vector. Therefore, the search area can be smaller than if the motion vector is detected by performing block matching in the search area of the pre-set pixel size previously set for all macroblocks making up the frame picture, so that the number of times of block matching can be reduced. Thus, with the motion vector detection device 1 according to the third embodiment, it is possible to reduce the processing required for detecting the motion vector appreciably. Specifically, with the motion vector detection device 1 of the present third embodiment, if the search range R at the aforementioned step S43 is 32×32 pixels and the search range r in case of having reference to the neighboring macroblock is 6×6 pixels, the processing time for detecting the motion vector for the totality of macroblocks making up a frame picture can be reduced to approximately 1/100.

Also, with the motion vector detection device 1 of the present third embodiment, the direction pointed by each motion vector of the macro-block, in which the processing shown at steps S49 and S50 is executed to check the direction pointed by the motion vector of the macroblock neighboring to the macroblock, the motion vector is to be detected, and the search range to be set is changed in dependence upon the direction pointed by each motion vector, so that, if the motion vector of the neighboring macroblock points to the different directions, it is possible to detect the motion vector to high accuracy.

Meanwhile, it is possible for the motion vector detection device according to the first to third embodiments to execute only the processing explained in the first to third embodiments, or to execute combined processing to set the search range to detect the motion vector. This renders it possible for the motion vector detection device to reduce the processing volume further to in detecting the motion vector.

Industrial Applicability

As described above, with the motion vector detection method and device pertaining to the first object of the present invention, the search area for detecting the motion vector for the third field picture is computed by comparing the field-to-field distance between the reference field picture and the third field picture and the field-to-field distance between the first field picture and the second field picture, so that the size of the search range in determining the motion vector for the third field picture can be changed. Therefore, with the present motion vector detection method and device, a search range with a small size can be set by exploiting the high correlation between the top field picture and the bottom field picture in the motion vector. Therefore, with the present motion vector detection method and apparatus, the number of times of block matching and hence the processing time can be reduced by reducing the search range of block matching for detecting the motion vector.

Also, with the motion vector detection method and device pertaining to the second object of the present invention, in which a first search range, centered about a point specified by the motion vector of the reference block contained in the reference frame temporally or spatially proximate to the target frame, is determined, a second search range, centered about a point obtained on elongating the motion vector of the reference block in dependence upon the frame-to-frame distance, is also determined, and the motion vector of the target block is detected within the motion vector search range containing the first and second search ranges, the motion vector can be detected by deforming the motion vector search range in dependence upon the motion vector of the reference block. Therefore, with the present motion vector detection method and device, the motion vector search range can be smaller than if the motion vector search range is fixed, and hence the number of times of block matching for detecting the motion vector can be reduced to reduce the processing volume.

In addition, with the motion vector detection method and device pertaining to the third object of the present invention, in which the second search range for detecting the motion vector of the second block is set on the basis of the motion vector for the first block neighboring to both sides of the second block in the horizontal direction or in the vertical direction, and the motion vector of the second block is detected by block matching in the second search range, the second motion vector for the second block can be detected by block matching in the second search range different in pixel size from the search range used in detecting the motion vector for the first block. Therefore, with the present motion vector detection method and device, the second search range can be of a smaller pixel size than the first search range in dependence upon the motion vector of the first block neighboring to the second block, and hence it becomes possible to reduce the processing volume and the processing time in detecting the motion vector.

What is claimed is:

1. A motion vector detecting method for detecting the motion vector in a field picture conforming to the interlaced scanning system, comprising:
   detecting a motion vector of a second field in a pre-set search range, using a first field picture;
   computing a search range for detecting the motion vector of a third field picture, by comparing a field-to-field distance between a field picture to be referred to and a third field picture and a field-to-field distance between the first field picture and a second field picture; and
   detecting a motion vector for a third field picture with the computed search range with a point indicated by the motion vector for the second field picture as a starting point.

2. A motion vector detecting apparatus for detecting the motion vector in a field picture conforming to the interlaced scanning system, comprising:
   first motion detection means for detecting a motion vector of a second field in a pre-set search range, using a first field picture;
   search range computing means for computing a search range for detecting the motion vector of a third field picture, by comparing a field-to-field distance between a field picture to be referred to and a third field picture and a field-to-field distance between the first field picture and a second field picture; and
   second motion detection means for detecting a motion vector for a third field picture with the search range computed by said search range decision means with a point indicated by the motion vector for the second field picture as a starting point.

3. A motion vector detection method comprising:
   determining a first search range centered about a point specifying a motion vector of a reference block contained in a reference frame temporally or spatially proximate to a target frame;
   determining a second search range centered about a point obtained on elongating a motion vector of said reference block in dependence upon the frame-to frame distance between the target frame and the reference frame; and
   computing, in a motion vector search range containing said first search range and the second search range, picture data of the target block contained in the target frame and picture data of the reference block contained in the reference frame, to detect a motion vector of the target block.

4. The motion vector detection method according to claim, 3 wherein
   the magnitude of said second search range relative to that of said first search range is determined in dependence upon the frame-to-frame distance between the target frame and the reference frame.

5. The motion vector detection method according to claim 3 wherein
   a connecting line interconnecting said first search range and the second search range and a third motion search range surrounded by said first search range and the second search range are determined; and wherein
   picture data of the target block and picture data of the reference block are computed in the third search range to detect the motion vector of the target block.

6. The motion vector detection method according to claim 5 wherein
   said first search range and the second search range are circular; and wherein
   picture data of said target block and the picture data of said reference block are computed within said motion vector search range surrounded by said first search range and the second search range to detect the motion vector of the reference block.

7. The motion vector detection method according to claim 5 wherein
   said first search range and the second search range are rectangular; and wherein
   picture data of said target block and the picture data of said reference block are computed within said motion vector search range surrounded by said first search range and the second search range to detect the motion vector of the reference block.

8. The motion vector detection method according to claim 3 wherein
   a flag is generated for an range specifying said motion vector search range;
   a decision as to whether or not the motion vector is to be detected is given in accordance with said flag; and wherein
   picture data of said target block and the picture data of said reference block are computed to detect the motion vector in the target block.

9. A motion vector detection device comprising:
   first range determining means for determining a first search range centered about a point specifying a motion vector of a reference block contained in a reference frame temporally or spatially proximate to a target frame;

second range determining means for determining a second search range centered about a point obtained on elongating a motion vector of sais reference block in dependence upon the frame-to-frame distance between a target frame and a reference frame;

motion vector detection means for computing picture data of a target block contained in the target frame and picture data of a reference block in the reference frame in a motion vector search range containing a first search range from said first range determined means and a second search range from said second search range to detect the motion vector of the reference block.

10. The motion vector detection device according to claim 9 wherein said second range determining means determines the magnitude of said second search range relative to said first search range responsive to the frame-to-frame distance between the target and reference frames.

11. The motion vector detection device according to claim 9 comprising:

motion vector range determining means for determining the motion vector search range surrounded by a connecting line interconnecting the first and second search ranges and by said first and second search ranges;

said motion vector detection means computing picture data of the target block and picture data of the reference block in the motion vector search range from said motion vector range determining means to detect the motion vector of the target block.

12. The motion vector detection device according to claim according to claim 11 wherein said first and second range determining means set the first and second search ranges so as to be circular;

said motion vector detection means computing picture data picture data of the target block and picture data of the reference block in said motion vector search range surrounded by the connecting line interconnecting the first and second search ranges and said first and second search ranges to detect a motion vector of the target block.

13. The motion vector detection device according to claim according to claim 11 wherein said first and second range determined means set the first and second search ranges so as to be rectangular;

said motion vector detection means computing picture data picture data of the target block and picture data of the reference block in said motion vector search range surrounded by the connecting line interconnecting the first and second search ranges and said first and second search ranges to detect a motion vector of the target block.

14. The motion vector detection device according to claim 9 further comprising:

flag generating means for generating a flag for an area specifying said motion vector search range;

said motion vector detection means verifying whether or not a motion vector is to be detected in accordance with a flag generated by said flag generating means, said motion vector detection means computing picture data of said target block and picture data of said reference block to detect the motion vector of the target block.

15. A motion vector detection method for detecting a motion vector for a picture composed of a plurality of blocks, comprising:

detecting a motion vector of a first block in a first search range;

setting a second search range in detecting the motion vector of a second block based on a motion vector for the first blocks neighboring to said second block on either sides of said second block in the horizontal direction or vertical direction; and detecting the motion vector of the second block by block matching performed in said second search range.

16. The motion vector detection method according to claim 15 wherein the directions pointed by motion vectors for said first blocks neighboring to said second block on either sides of said second block in the horizontal direction or vertical direction are verified; and wherein said second search range is set in dependence upon the direction pointed by said motion vector.

17. The motion vector detection method according to claim 16 wherein, if the directions pointed by motion vectors for said first blocks neighboring to said second block on either sides of said second block in the horizontal direction or vertical direction are substantially equal to each other, the motion vectors are averaged to set the second search range.

18. The motion vector detection method according to claim 16 wherein, if the directions pointed by motion vectors for said first blocks neighboring to said second block on either sides of said second block in the horizontal direction or vertical direction differ from each other, said second search range is set in accordance with the directions indicated by said motion vectors.

19. A motion vector detection device for detecting the motion vector for a picture composed of a plurality of blocks, comprising:

first motion vector detection means for detecting the motion vector for the first block in a first search range;

search range setting means for setting a second search range in detecting the motion vector of a second block based on motion vectors for the first blocks neighboring to said second block on either sides of said second block in the horizontal direction or vertical direction, said motion vectors for the first blocks having been detected by said first motion vector detection means; and detecting the motion vector of the second block by block matching performed in said second search range.

20. The motion vector detection device according to claim 19 wherein said search range setting means verifies the directions pointed by said motion vectors for said first blocks neighboring to both sides of said second block in the horizontal direction or vertical direction to set the second search range in dependence upon the direction pointed by each motion vector.

21. The motion vector detection device according to claim 20 wherein, if the directions pointed by motion vectors for said first blocks neighboring to said second block on either sides of said second block in the horizontal direction or vertical direction are substantially equal to each other, the search range setting means averages the motion vectors to set the second search range.

22. The motion vector detection device according to claim 20 wherein, if the directions pointed by motion vectors for said first blocks neighboring to said second block on either sides of said second block in the horizontal direction or vertical direction differ from each other, the search range setting means sets said second search range in accordance with the directions indicated by said motion vectors.

* * * * *